May 20, 1924.
L. W. NIMSCHKE
TIRE
Filed Feb. 17, 1923
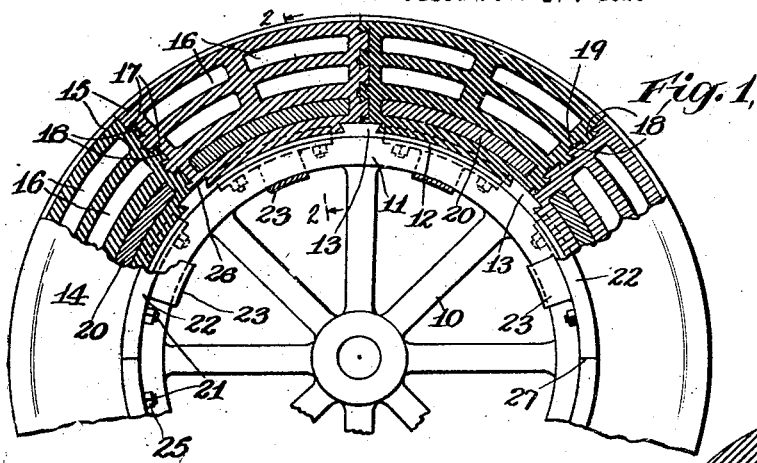
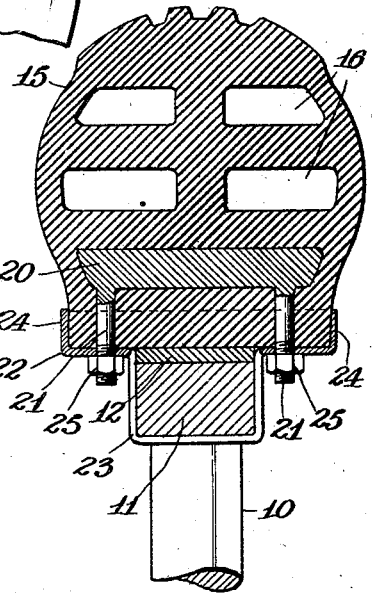
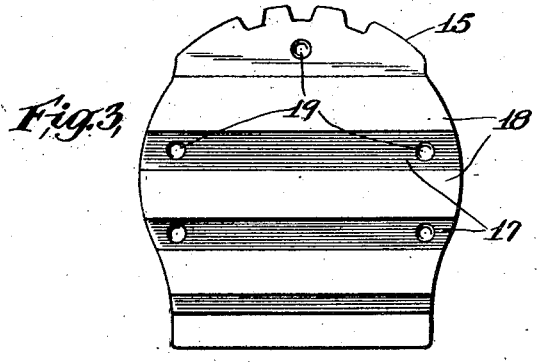
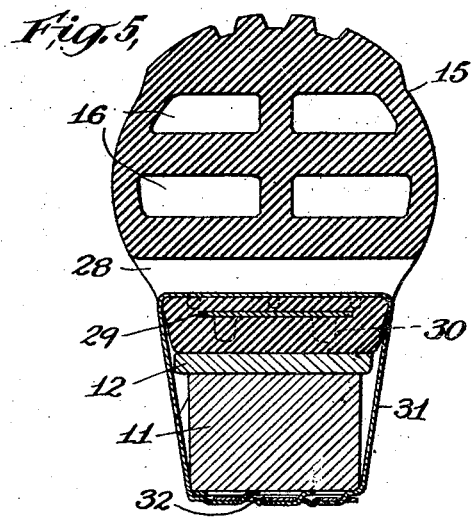
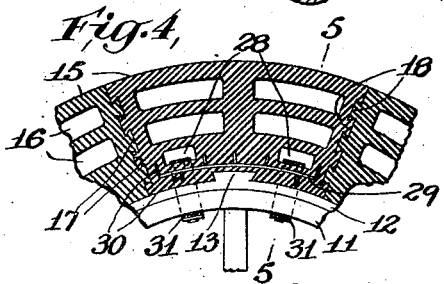
Inventor
Louis W. Nimschke
By his Attorneys
Edgar Tate Patented May 20, 1924.

1,494,797

UNITED STATES PATENT OFFICE.

LOUIS W. NIMSCHKE, OF OLD BRIDGE, NEW JERSEY.

TIRE.

Application filed February 17, 1923. Serial No. 619,640.

*To all whom it may concern:*

Be it known that I, LOUIS W. NIMSCHKE, a citizen of the United States, and residing at Old Bridge, in the county of Middlesex and State of New Jersey, have invented certain new and useful Improvements in Tires, of which the following is a specification, such as will enable those skilled in the art to which it appertains to make and use the same.

This invention relates to tires and particularly to tires adapted for use in connection with motor vehicles and of a non-pneumatic or semi-solid type, and the object of the invention is to provide a tire construction of the class specified composed of a plurality of tire sections adapted to be mounted on the periphery or rim of a wheel to form an annular tire; a further object being to provide means for coupling the separate tire sections one with another and to the rim of the wheel; a further object being to provide an improved tire supporting rim for retaining the tire against displacement on the rim or felly of a wheel; a still further object being to provide means for reinforcing the inner or rim portion of the tire or the separate sections thereof; and with these and other objects in view the invention consists in a tire construction of the class and for the purpose specified which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a side view of a part of my improved tire construction mounted thereon with part of the construction broken away and in section;

Fig. 2 a partial section on the line 2—2 of Fig. 1 on an enlarged scale;

Fig. 3 an edge view of one of the tire sections which I employ;

Fig. 4 a view similar to Fig. 1 showing only a detail of the construction and showing a modification; and, Fig. 5 a partial section on the line 5—5 of Fig. 4.

In Fig. 1 of the drawing I have shown at 10 a wheel, the felly 11 of which is provided with a rim 12 having at intervals, spaced circumferentially of the outer surface thereof, projecting beveled or dovetailed tongue members 13, and mounted on the wheel 10 in the construction shown in Figs. 1 to 3 inclusive is one form of my improved tire construction 14.

The tire construction 14, as shown in Figs. 1 to 3 inclusive, is composed of a plurality of similar tire sections 15 molded to form a plurality of compartments 16 and at the ends of said tire sections are formed grooves 17 and corresponding projecting dove-tailed members 18 which are so positioned on the opposite ends of said tire sections as to permit of the interlocking of one tire section with the other as clearly illustrated in Fig. 1 of the drawing. The end faces of the sections 15 are provided at one end with spaced projecting members 19 which cooperate with corresponding recesses in the other ends of adjacent sections.

Imbedded in each of the tire sections 15 and extending longitudinally of the rim portion are plates 20 having threaded rods 21, which project inwardly through the inner surfaces of said sections, as clearly shown in Fig. 2 of the drawing, and mounted on the felly 11 of the wheel are a plurality of tire supporting rim members 22 having yoke-shaped cross head portions 23 which encircle the felly 11 and provided at the opposite sides thereof with flanges 24 adapted to pass over and enclose the rim portions of the tire sections 15, and the tire supporting rim members 22 are apertured to permit of the passage of the threaded pins to retain the entire rim members in position as clearly shown in Fig. 2.

The adjacent faces of the separate tire sections 15 are also recessed as shown at 26 to receive the projecting tongue members 13 on the rim 12 of the wheel, and these tongue members are preferably located where the separate tire sections abut as clearly shown in Fig. 1 of the drawing, and these tongue members serve to prevent the creeping of the tire sections circumferentially of the wheel.

With the tire construction shown in Figs. 1 to 3 inclusive, it will be understood that after the rim 12 is mounted upon the wheel, or the felly thereof, by screws, bolts or in any other manner the separate tire sections are placed on the rim 12 in the manner shown in Fig. 1 with the projecting members 18 interlocking with the grooves 17 in the adjacent ends of the tire sections, and after all of said tire sections have been placed in position to form an annular tire, the separate rim members 22 are passed outwardly over the felly 11 of the wheel and secured in position by the nuts 25, it being understood that said rim members are preferably spaced between the spokes of the wheel 10 as indicated in Fig. 1 of the drawing. It will also be noted that the flanges 24 of the rim members 22 are preferably of such length as to abut one with the other as indicated at 27 in Fig. 1 of the drawing.

In Figs. 4 and 5 I have shown a slight modification of the construction shown in Figs. 1 to 3 inclusive in which the plate 20 and threaded pins 21 are omitted, and in this construction the rim portion of the separate tire sections 15 are provided with spaced transverse apertures 28 opening outwardly through the opposite sides of said tire sections, and inwardly of said apertures a reinforcing plate 29 is imbedded in the separate tire sections, said plate being provided with a plurality of projecting anchor members 30.

In the use of the tire construction shown in Figs. 4 and 5 of the drawing, metallic fabric or other strap members 31 are passed transversely through the apertures 28 downwardly around the felly 11 of the wheel and interlocked or joined together as shown at 32 to secure the tire or the separate sections 15 thereof to the rim of the wheel. With the construction shown in Figs. 4 and 5 it will also be noted that the projecting tongue members 13 on the rim 12 are located centrally of the separate tire sections instead of at the adjacent ends thereof as shown in Fig. 1 of the drawing.

With both forms of tire constructions herein shown and described, I provide a non-pneumatic and semi-solid tire which by reason of its construction will be comparatively light and possesses as near as possible the resilient qualities of a pneumatic tire, and by constructing the tire of separate sections in the manner shown and described the cost of producing the entire tire is materially decreased, and while I have shown certain details of construction for carrying my invention into effect, it will be understood that I am not necessarily limited to these details and various changes in and modifications of the construction herein shown and described may be made, within the scope of the appended claims, without departing from the spirit of my invention or sacrificing its advantages.

Having fully described my invention, what I claim as new and desire to secure by Letters Patent, is:—

1. A tire construction of the class described comprising a plurality of tire sections, means for coupling a plurality of said sections together to form a complete tire, means for retaining said tire and the separate sections thereof against displacement on a wheel, said means comprising projecting members on the rim of a wheel engaging corresponding recesses in said tire sections, and means coupled with said tire sections and encircling predetermined portions of the felly of the wheel.

2. The combination with a wheel provided with a rim having spaced projecting dove-tailed members, of a tire composed of a plurality of sections having recesses fashioned to receive the projecting members of said rim, and dove-tailed means for interlocking said tire sections.

3. The combination with a wheel provided with a rim having spaced projecting dove-tailed members, of a tire composed of a plurality of sections having recesses fashioned to receive the projecting members of said rim, dove-tailed means for interlocking said tire sections, and means for reinforcing the rim portions of said tire sections.

4. The combination with a wheel provided with a rim having spaced projecting dove-tailed members, of a tire composed of a plurality of sections having recesses fashioned to receive the projecting members of said rim, dove-tailed means for interlocking said tire sections, means for reinforcing the rim portions of said tire sections, and means for retaining said tire sections against displacement on the rim of the wheel, said means involving members encircling the felly of the wheel.

5. A tire construction of the class described comprising a plurality of hollow resilient tire sections, the inner faces of said sections being provided with recesses adapted to receive spaced projecting dove-tailed members on the rim of a wheel for keying said sections against movement circumferentially of the rim, means on the adjacent and abutting faces of said sections for interlocking the same, one with the other, and a plate imbedded in the inner portions of said sections for reinforcing the same.

6. A tire construction of the class described comprising a plurality of hollow resilient tire sections, the inner faces of said sections being provided with recesses adapted to receive spaced projecting dove-tailed members on the rim of a wheel for keying said sections against movement circumferentially of the rim, means on the adjacent and abutting faces of said sections for interlocking the same, one with the other, a plate imbedded in the inner portions of said sections for reinforcing the same, means for retaining said sections in connection with the rim and felly of the wheel, said means involving bands extending around the felly.

7. A tire construction of the class described comprising a plurality of hollow resilient tire sections, the inner faces of said sections being provided with recesses adapted to receive projecting members, key members on the rim of a wheel for retaining said sections against circumferential movement on the rim, and yoke-shaped bands adapted to span the felly of a wheel and to be coupled with said tire sections for retaining the same in predetermined position.

8. A tire construction of the class described comprising a plurality of hollow resilient tire sections, the inner faces of said sections being provided with recesses adapted to receive projecting members, key members on the rim of a wheel for retaining said sections against circumferential movement on the rim, yoke-shaped bands adapted to span the felly of a wheel and to be coupled with said tire sections for retaining the same in predetermined position, and means imbedded in the tire sections for reinforcing the rim portions thereof.

9. A tire construction of the class described comprising a plurality of hollow resilient tire sections, the inner faces of said sections being provided with recesses adapted to receive projecting members, key members on the rim of a wheel for retaining said sections against circumferential movement on the rim, yoke-shaped bands adapted to span the felly of a wheel and to be coupled with said tire sections for retaining the same in predetermined position, means imbedded in the tire sections for reinforcing the rim portions thereof, and means for interlocking the adjacent faces of the tire sections.

In testimony that I claim the foregoing as my invention I have signed my name this 15th day of Feb., 1923.

LOUIS W. NIMSCHKE.